UNITED STATES PATENT OFFICE.

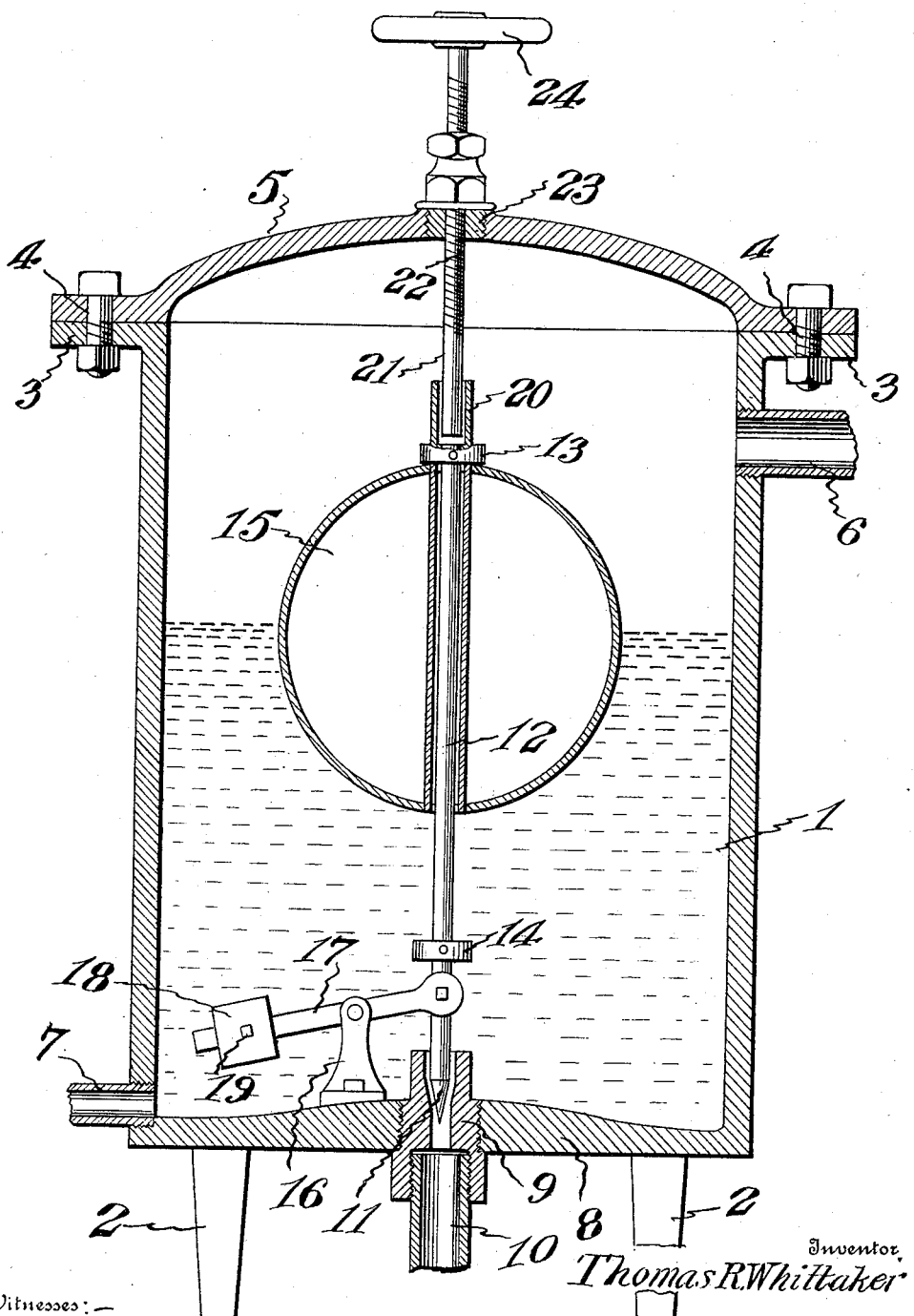

THOMAS R. WHITTAKER, OF LAWRENCE, MASSACHUSETTS.

STEAM-TRAP.

No. 902,355.  Specification of Letters Patent.  Patented Oct. 27, 1908.

Application filed April 14, 1908. Serial No. 426,985.

*To all whom it may concern:*

Be it known that I, THOMAS R. WHITTAKER, a citizen of the United States, residing at Lawrence, in the county of Essex and State of Massachusetts, have invented new and useful Improvements in Steam-Traps, of which the following is a specification.

This invention relates to steam traps, and the object of the invention is to provide a simple, economical automatical steam trap that is not liable to get out of order, and which embodies certain peculiarities of construction and combination of parts, hereinafter fully described and claimed.

The drawing represents a vertical sectional view of a steam trap constructed in accordance with my invention.

The numeral 1 represents a shell. This shell 1 is preferably cylindrical and is provided upon its bottom with the legs 2 and has its top provided with a flange 3 having a series of spaced orifices adapted for the reception of retaining elements 4, by which a dome-shaped top 5 is secured upon the shell 1. The shell 1 is provided with an upper inlet pipe 6 and a blow off pipe 7 positioned preferably opposite the inlet pipe 6 and in a line with the floor or bottom 8 of the chamber 1. The floor 8 of the chamber 1 is provided with a threaded orifice, preferably centrally located and adapted for the reception of a brass valve seat 9. The valve seat 9 is constructed as a nipple and is provided with an enlarged threaded extension adapted for engagement with the threaded portion of an outlet pipe 10.

Adapted for reception within the valve seat 9 is a needle valve 11. This valve 11 is provided with a suitable stem 12 extending vertically within the chamber 1, and the stem 12 is provided with spaced collars 13 and 14. The collars 13 and 14 are adjustably secured upon the stem 12, and between these collars the stem is provided with a ball float 15. The float 15 is loose upon the stem 12, and is of such a weight as to readily seat the valve 11 in the valve seat 9 when the float descends and contacts the lower collar 14.

The floor 8 of the chamber 1 is provided with an upstanding lug or ear 16, adapted for pivotal connection with an arm 17 connected with the stem 12 below the collar 14. This arm 17 is provided with a weight 18, having a suitable threaded element 19, by which the weight may be adjusted upon the arm 17. It is to be understood that the weight 18 is heavier than the valve stem 12 and the collars 13 and 14, and is adapted to retain the valve 11 unseated when the float 15 is raised from contact with the collar 14, and it is to be also understood that the float 15 is of sufficient weight to overcome the weight 18 and to force the valve 11 into engagement with its seat 9.

The collar 13 is provided with an upwardly extending sleeve 20, and this sleeve 20 is adapted for engagement with a stem 21 having a threaded portion 22 coacting with a threaded bushing 23 provided upon the cover 5. This stem 21 is provided with an operating handle 24, and is adapted to be positioned in direct vertical alinement with the valve seat 9 and to serve as a means for guiding and retaining the stem 12 in proper alinement with the valve seat 9.

From the above description, taken in connection with the accompanying drawing, it will be apparent that when the water of condensation accumulates in the pipe the valve will be unseated by the loose float 15 rising away from engagement with the collar 14, when the weight 18 will raise the valve to allow the water to escape through the outlet 10. Should the condensation become so great as to raise the float to the position illustrated in the drawing, the float will contact the collar 13 and materially assist the weight 18. When the water of condensation escapes through the outlet 10, the float 15 will descend and contacting the collar 14 force the valve 11 upon its seat 9. The blow-out pipe 7 is provided with a suitable valve which may be readily operated to drain all the water from the chamber 1.

Having thus fully described the invention what is claimed as new is:

A steam trap comprising a suitable hollow structure having an inlet at its upper portion and its bottom provided with an outlet, a valve arranged to govern the outlet, a stem extending upward from the valve, ears upon the bottom of the structure, an arm pivoted to the ears and connected with the valve stem, an adjustable weight upon the arm, said weight adapted to sustain the valve unseated, adjustable collars upon the stem, a float loose upon the stem between the collars, the upper collar being provided with a hollow extension, and a threaded stem provided upon the top of the structure to engage within the hollow extension to guide the valve stem.

In testimony whereof I affix my signature in presence of two witnesses.

THOMAS R. WHITTAKER.

Witnesses:
GEORGE W. NAYCOCK,
THOMAS W. WHITTAKER.